United States Patent [19]

Rudolph

[11] Patent Number: 4,957,695
[45] Date of Patent: Sep. 18, 1990

[54] NUCLEAR REACTOR FUEL ASSEMBLY

[75] Inventor: Matthias Rudolph, Weisendorf, Fed. Rep. of Germany

[73] Assignee: Siemens Aktiengesellschaft, Berlin and Munich, Fed. Rep. of Germany

[21] Appl. No.: 449,365

[22] Filed: Dec. 4, 1989

Related U.S. Application Data

[63] Continuation of Ser. No. 149,545, Jan. 28, 1988, abandoned.

[30] Foreign Application Priority Data

Jan. 28, 1987 [DE] Fed. Rep. of Germany ....... 3702506

[51] Int. Cl.$^5$ .......................... G21C 1/01; G21C 3/32
[52] U.S. Cl. ..................................................... 376/364
[58] Field of Search .................................. 376/362, 364

[56] References Cited

U.S. PATENT DOCUMENTS

| | | |
|---|---|---|
| 3,158,543 | 11/1964 | Sherman et al. |
| 3,166,481 | 1/1965 | Braun ................................. 376/364 |
| 3,205,144 | 9/1965 | Jabsen ................................. 376/364 |
| 3,506,540 | 4/1970 | Yevick et al. ....................... 376/364 |
| 3,578,563 | 5/1971 | Strohmeyer, Jr. .................. 376/362 |
| 3,853,703 | 12/1974 | Anthony et al. .................... 376/362 |
| 3,971,575 | 7/1976 | Lesham et al. ...................... 376/364 |
| 4,006,055 | 2/1977 | Knodler et al. ..................... 376/362 |
| 4,278,501 | 7/1981 | Steinke . |
| 4,298,434 | 11/1981 | Anthony et al. .................... 376/364 |
| 4,670,213 | 6/1987 | Wilson et al. ....................... 376/364 |
| 4,755,351 | 7/1988 | Baloh et al. ......................... 376/362 |
| 4,762,661 | 8/1988 | Leclercq et al. .................... 376/364 |

FOREIGN PATENT DOCUMENTS

| | | |
|---|---|---|
| 2140170 | 2/1973 | Fed. Rep. of Germany . |
| 2331352 | 2/1974 | Fed. Rep. of Germany . |
| 2148549 | 3/1973 | France . |

Primary Examiner—Harvey E. Behrend
Attorney, Agent, or Firm—Herbert L. Lerner; Laurence A. Greenberg

[57] ABSTRACT

A nuclear reactor fuel assembly has a plurality of fuel rods filled with nuclear fuel, and a fuel assembly base having a longitudinal axis, a jacket, and a resilient support element in the form of a shock-absorbing leg to be placed upon a support structure of a nuclear reactor. The shock-absorbing leg is parallel to the longitudinal axis and disposed on the outside of the jacket. The shork-absorbing leg has a lower end forming a stop surface for the support structure.

6 Claims, 5 Drawing Sheets

NUCLEAR REACTOR FUEL ASSEMBLY

This application is a continuation of application Ser. No. 149,545, filed Jan. 28, 1988, now abandoned.

The invention relates to a nuclear reactor fuel assembly having a plurality of fuel rods filled with nuclear fuel, and a fuel assembly base having a resilient support element for placement upon a support structure in a nuclear reactor.

A nuclear reactor fuel assembly of this type is known from German Patent DE-PS No. 2 140 2170. In this prior art nuclear reactor fuel assembly, the resilient support part is a frame, which is guided by alignment pins on the support structure in the nuclear reactor and in turn has alignment pins for guiding the base of the fuel assembly. The fuel assembly base is supported by resilient support pins, which are movably guided in the longitudinal direction by the frame. The frame is thus located between the fuel assembly base and the support structure in the nuclear reactor.

It has been found that in a frame of this kind in pressurized water nuclear reactors, in which the flowing coolant undergoes particularly high pressure losses at the nuclear reactor fuel assemblies, vibration caused by the flowing coolant can arise and cause damage in the nuclear reactor fuel assembly.

It is accordingly an object of the invention to provide a nuclear reactor fuel assembly, which overcomes the hereinafore-mentioned disadvantages of the heretofore-known devices of this general type and which refines the prior art nuclear reactor fuel assembly in such a way that vibration of this kind is avoided.

With the foregoing and other objects in view there is provided, in accordance with the invention, in a nuclear reactor having a support structure, the improvement comprising a nuclear reactor fuel assembly having a plurality of fuel rods filled with nuclear fuel, and a fuel assembly base having a longitudinal axis, a jacket, and a resilient support element in the form of a shock-absorbing leg to be placed upon the support structure, the shock-absorbing leg being parallel to the longitudinal axis and disposed on the outside of the jacket, and the shock-absorbing leg having a lower end forming a stop surface for the support structure.

This structure permits direct guidance of the fuel assembly base by the support structure in the nuclear reactor, so that vibration of the fuel assembly base transverse or crosswise to the flow direction of the coolant in the nuclear reactor can be prevented.

In accordance with another feature of the invention, the fuel assembly base has a stop base for the lower end of the shock-absorbing leg.

In accordance with a further feature of the invention, there is provided a ring connected to the lower end of the shock-absorbing leg forming the stop surface for the support structure, the ring being seated on the fuel assembly base coaxially with the longitudinal axis or direction and being displaceable in longitudinal direction of the fuel assembly base.

In accordance with an added feature of the invention, the fuel assembly base has a guide portion to be fitted into the support structure.

In accordance with an additional feature of the invention, the guide portion is a sliding block on the outside of the jacket of the fuel assembly base.

In accordance with yet another feature of the invention, the sliding block has a sliding surface and a sliding roller on the sliding surface.

In accordance with a concomitant feature of the invention, the sliding block has a sliding surface and a radially acting support spring on the sliding surface.

Through the use of theses features, such vibration can be even more surely prevented.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 5:
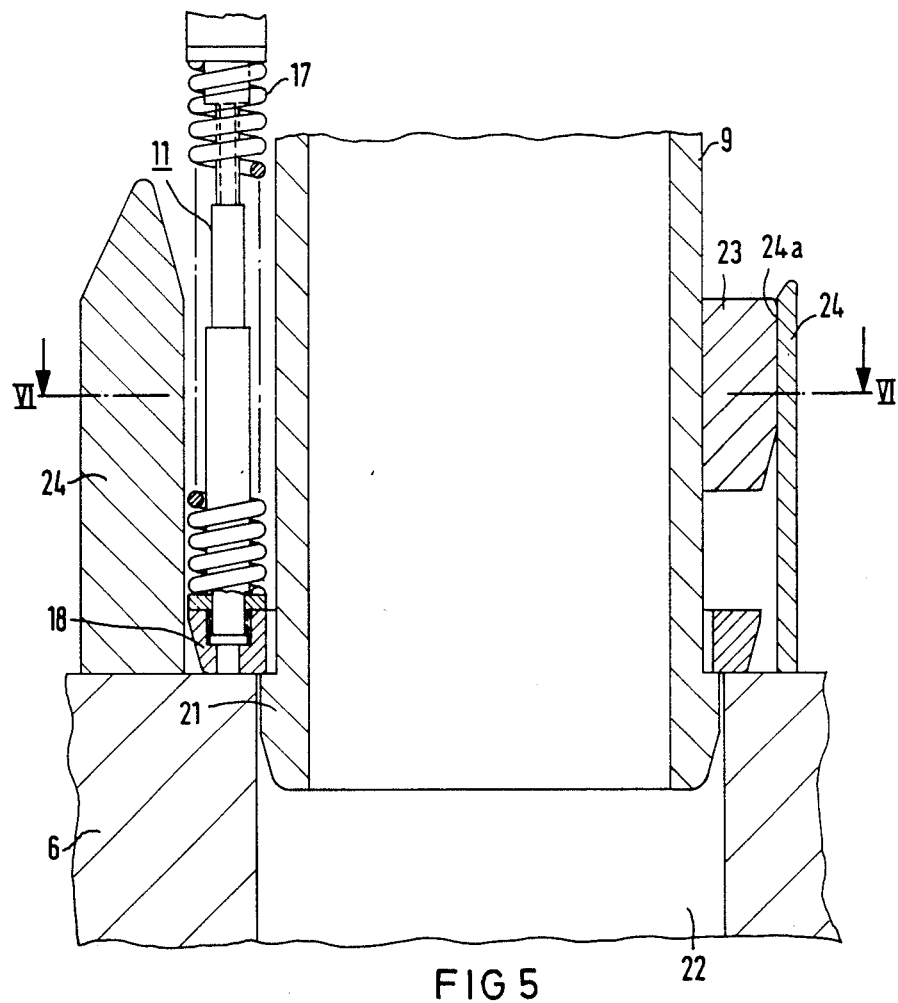
Figure 6:
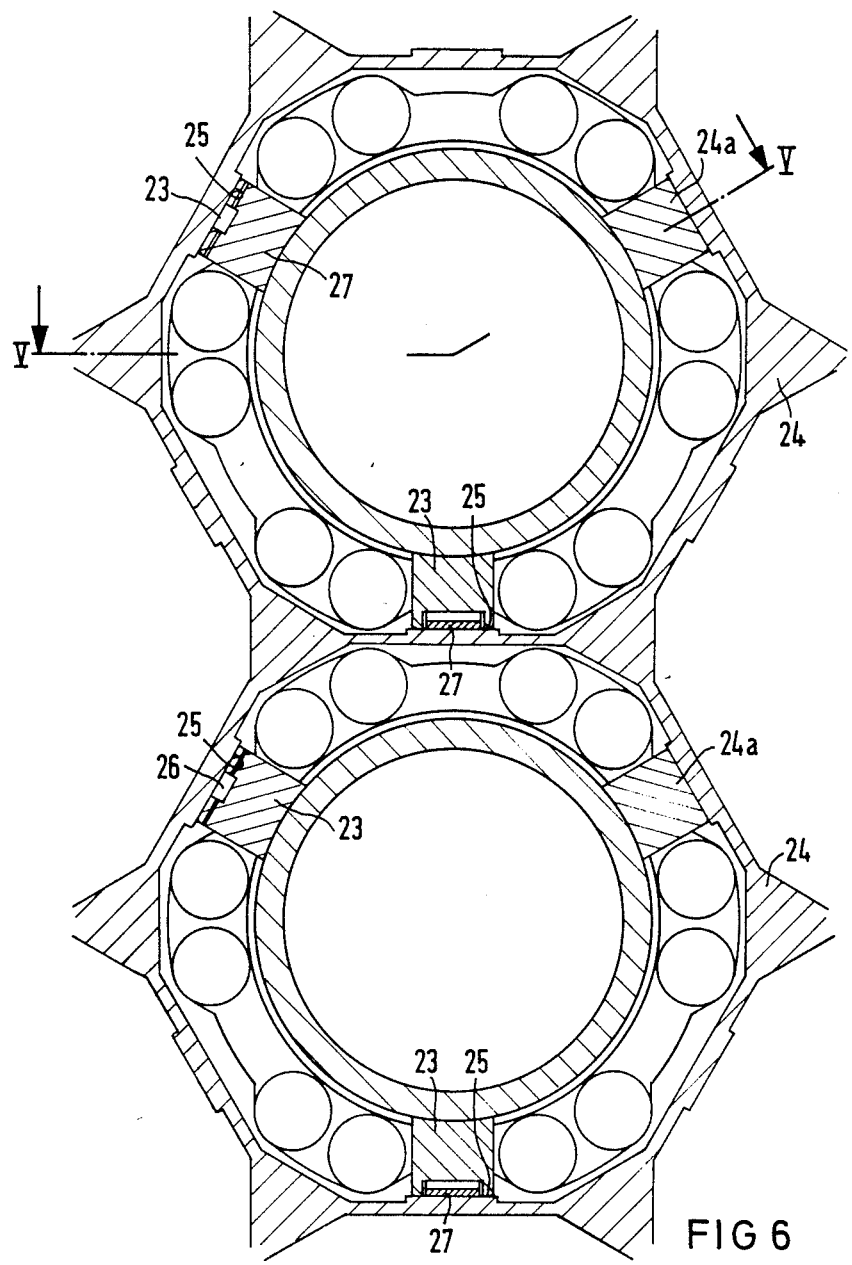

FIG. 5 is a longitudinal-sectional view taken along the line V—V of FIG. 6 in the direction of the arrows, showing a further embodiment of the base of a fuel assembly according to the invention, which is disposed in a pressurized water reactor; and FIG. 6 is a cross-sectional view taken along the line VI—VI of FIG. 5 in the direction of the arrows, showing the fuel assembly bases of FIG. 5 for two fuel assemblies disposed beside one another in the pressurized water reactor.

Figure 1:
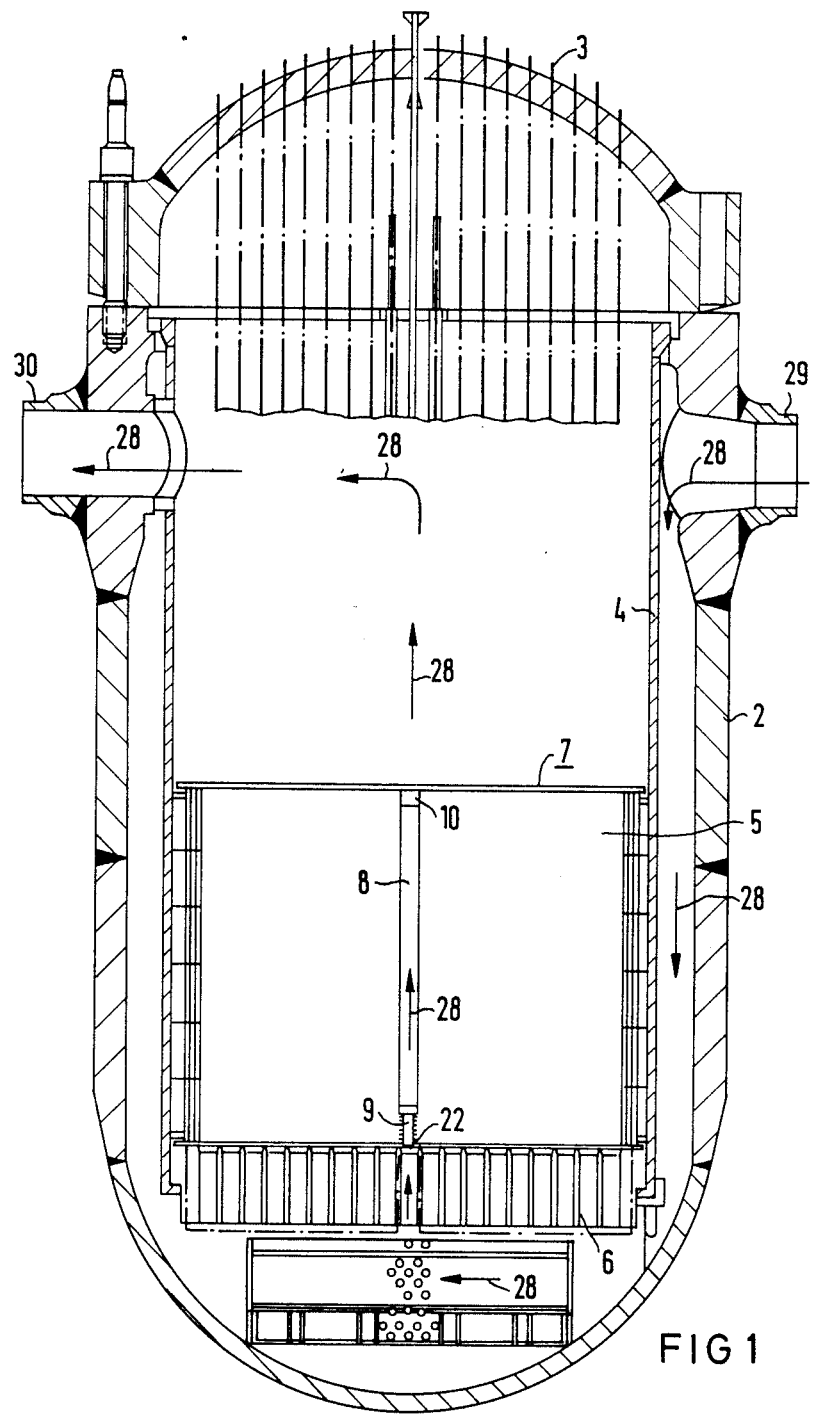
FIG. 1 is a fragmentary, highly diagrammatic, longitudinal-sectional view of the pressure vessel of a pressurized water reactor.

Referring now to the figures of the drawings in detail and first, particularly, to FIG. 1 thereof, there are seen control rods 3 in a dot-dash lines on the cap of a pressure vessel 2. A thermal shield 4, which laterally surrounds the so-called reactor core 5, is located in the lower portion of the pressure vessel 5.

Located in the reactor core 5 are a lower core grid 6 and an upper core grid 7 that is parallel to the lower core grid 6 and spaced apart from the lower core grid 6 in the direction of the longitudinal axis of the pressure vessel 2.

Nuclear reactor fuel assemblies are disposed between the two core grids 6 and 7 in such a way that the longitudinal axes thereof are parallel to the longitudinal axis of the pressure vessel 2 and perpendicular to the two grid plates 6 and 7. For the sake of clarity, only a single nuclear reactor fuel assembly 8 is shown in FIG. 1, with a fuel assembly base 9 and a fuel assembly top or top fitting 10.

The lower core grid 6 acts as a support structure in the pressure vessel 2 of the pressurized water reactor, on which the base 9 of the fuel assembly 8 is mounted. The fuel assembly 8 is held down on the lower core grid 6 by means of the upper core grid 7, into which the fuel assembly top 10 is fitted.

Figure 2:
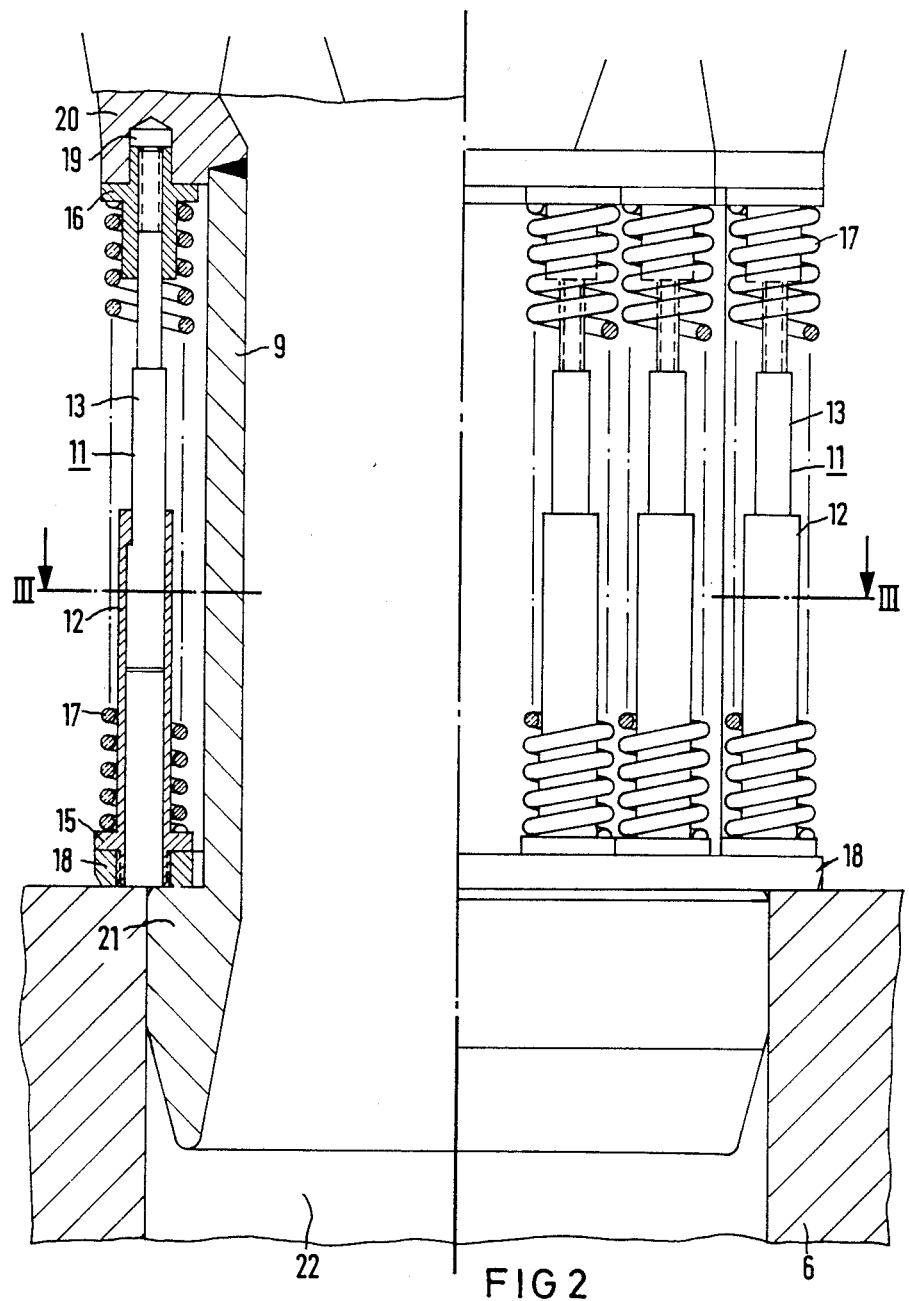
FIG. 2 is a partially longitudinal-sectional side view of the base of a nuclear reactor fuel assembly according to the invention.
Figure 3:
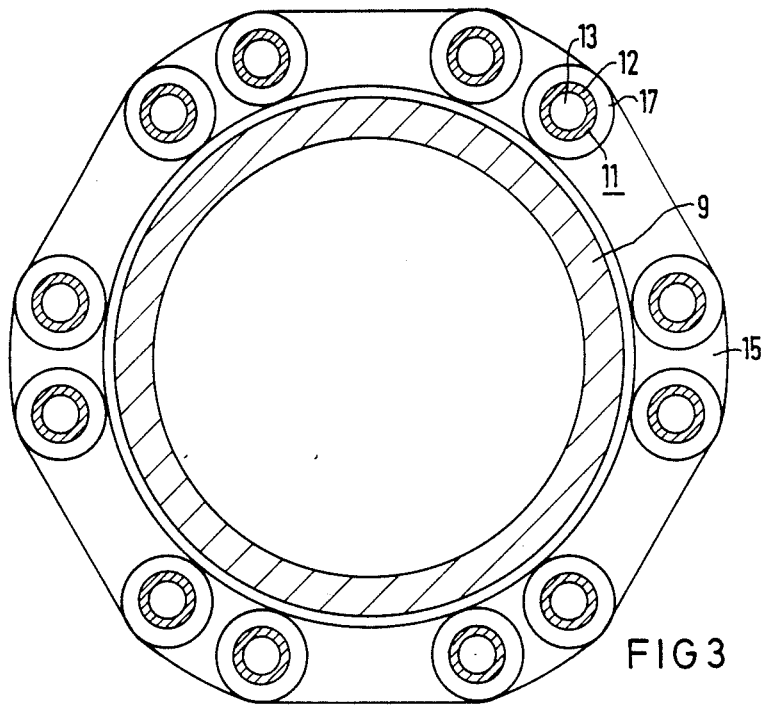
FIG. 3 is a cross-sectional view taken along the line III—III of FIG. 2, in the direction of the arrows.
Figure 4:
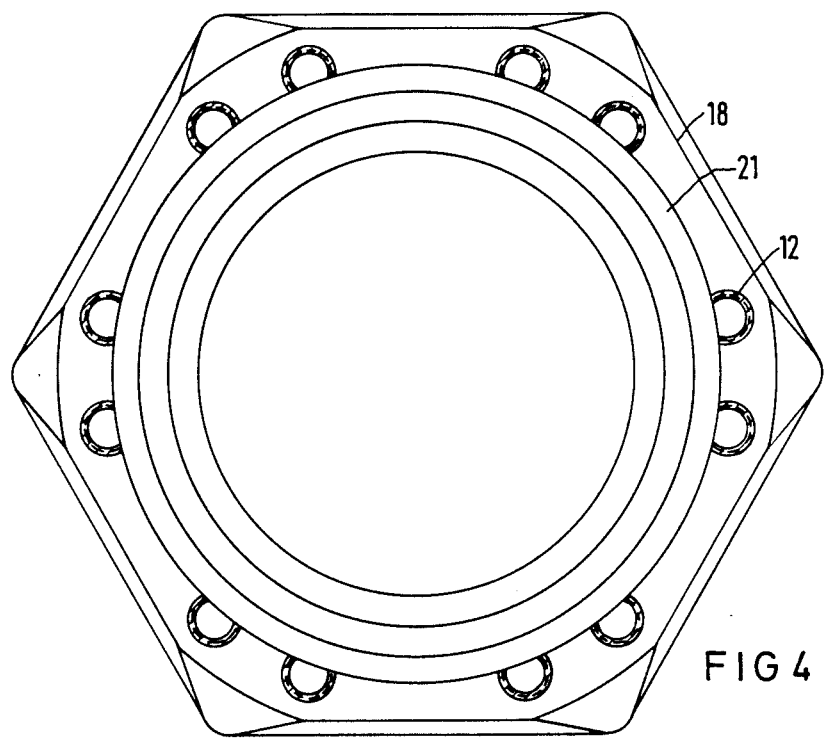
FIG. 4 is a bottom plan view of the fuel assembly base.

As FIGS. 2–4 show, the fuel assembly base 9 has six pairs of shock-absorbing legs 11 on the outside of the jacket or shell thereof, serving as a resilient support element for placement on the support structure formed by the lower core grid 6. The shock-absorbing legs 11 are parallel to the longitudinal axis of the fuel assembly base 9 and thus are also parallel to the longitudinal axis of the fuel assembly itself and the fuel rods thereof.

Each of the sock-absorbing legs 11 has a sheath 12 and a bolt 13, which are nested in one another in telescoping fashion and are displaceable relative to one another in the longitudinal direction. Located inside the sheath 12 is a stop for the bolt 13, which prevents the bolt 13 from being pulled all the way out of the sheath 12.

A flange 15 is attached to the outside of the end of the sheath 12, which is located on one end of the shock-absorbing legs 11, and a flange 16 is attached to the outside of the end of the bolt 13. A helical spring 17 belonging to each shock-absorbing leg 11 has an end supported on each flange 15 and 16. The helical spring 17 is accordingly coiled around the sheath 12 and bolt 13.

The lower ends of the shock-absorbing legs 11 having the flanges 15, are connected to a ring 18 forming a contact surface for the lower core grid or support structure 6. The ring 18 is mounted on the outside of the jacket or shell surface of the fuel assembly base 9, it is coaxial to the longitudinal direction, and is displaceable in the longitudinal direction. The upper ends of the shock-absorbing legs 11 on which the flanges 16 are located, are inserted into axial bores 19, which are located in a shoulder 20 on the outside of the jacket or shell surface of the fuel assembly base 9. The fuel assembly base has a stop surface for the ring 18 and thus for the lower ends of the shock-absorbing legs 11 as well, which is formed by means of a shoulder 21 spaced apart in the longitudinal direction from the shoulder 20. The ring 18 and the shock-absorbing legs 11 are firmly clamped between the shoulders 20 and 21 under the influence of the pressure exerted by the helical spring 17 upon the flanges 15 and 16.

The ring 18 protrudes beyond the shoulder 21 toward the outside in the radial direction. The outer jacket or shell of the fuel assembly base 9 also forms a guide portion at the shoulder 21 on the outermost lower end of the base 9, and this guide portion is fitted with a sliding seat into a duct 22 in the lower core grid 6 serving as the support structure in the pressure vessel 2. The portion of the ring 18 that radially protrudes outward beyond the shoulder 21 is thus seated on the support structure formed by the lower core grid 6. In other words, this portion of the ring 18 forms a stop surface for the lower core grid 6 acting as the support structure, and the upper core grid 7 presses the ring 18 against the support structure formed by the lower core grid 6, against the action of the helical spring 17, by way of the fuel assembly top 10, the fuel assembly and the shoulder 21 on the fuel assembly base 9. Before the fuel assembly 8 is firmly fastened to the upper core grid 7 in the reactor core 5, the shoulder 21 forms the stop surface for the ring 18 and thus for the lower ends of the shock-absorbing legs 11 at the fuel assembly base 9.

In the fuel assembly base shown in FIGS. 5 and 6, elements which are identical with those in FIGs. 2–4 are provided with the same reference numerals. The fuel assembly base has sliding blocks 23 on the outside of the jacket or shell of the fuel assembly base 9. Guide bodies 24 equipped with sliding surfaces 24a on the opt of the lower core grid 6 acting as a support structure, are associated with the sliding blocks 23. The sliding surface 25 of a sliding block 23 of this kind can also be provided with a sliding roller 26. Alternatively, a sliding block 23 of this kind can be provided with a leaf spring 27, in the form of a radially acting support spring on the sliding face 25.

As is shown by arrows 28 in FIG. 1, the liquid coolant flows through an inlet connection or stub 29 into the pressure vessel 2, where it flows over the outside of the thermal shield 4 to the bottom of the pressure vessel 2. At the bottom of the pressure vessel 2, the liquid cool and rises through the ducts in the lower core grid 6 into the reactor core 5, in which it also flows through the fuel assemblies 8, or in other words along the outside of the fuel rods of the fuel assemblies 8, to the upper core grid 7. After emerging from the upper core grid 7, the liquid coolant finally leaves the pressure vessel 2 through an outlet connection or stub 30. Even if there are heavy pressure losses for the coolant inside the fuel assemblies 8, vibration of the fuel assemblies 8 transverse to the flow direction is avoided.

Since the helical springs 17 of the shock-absorbing legs 11 have a relatively small spring diameter, the helical springs 17 can be constructed with a relatively high spring temper. Therefore, spring relaxation caused by neutron radiation cannot be extensive enough to cause an impermissibly great loss of spring temper of the helical springs 17 during the service life of the fuel assembly 8 in the pressurized water reactor.

The foregoing is a description corresponding in substance to German Application No. P 37 02 506.6, dated Jan. 28, 1987, the International priority of which is being claimed for the instant application, and which is hereby made part of this application. Any material discrepancies between the foregoing specification and the aforementioned corresponding German application are to be resolved in favor of the latter.

I claim:

1. In a nuclear reactor having a support structure, the improvement comprising a nuclear reactor fuel assembly having a plurality of fuel rods filled with nuclear fuel, and a fuel assembly base having a longitudinal axis, a jacket, first and second shoulders on the outside of said jacket, a resilient support element in the form of a shock-absorbing telescopic leg being parallel to said longitudinal axis and clamped between said shoulders on the outside of said jacket, said shock-absorbing telescopic leg having an upper end engaging said first shoulder and a lower end displaceable in longitudinal direction, and a ring connected to said lower end of said shock-absorbing telescopic leg, said ring being seated on said fuel assembly base coaxially with said longitudinal axis and being displaceable relative to and in longitudinal direction of said fuel assembly base, said ring forming a contact surface for mounting said ring on the support structure, and said second shoulder forming a stop surface for said lower end of said shock-absorbing telescopic leg.

2. Fuel assembly according to claim 1, wherein said fuel assembly base has a guide portion, and the support structure has means for cooperating with said guide portion.

3. Fuel assembly according to claim 2, wherein said guide portion is a sliding block on the outside of said jacket of said fuel assembly base for sliding on said cooperating means.

4. Fuel assembly according to claim 3, wherein said sliding block has a sliding surface for engaging said cooperating means and a roller on said sliding surface.

5. Fuel assembly according to claim 3, wherein said sliding block has a sliding surface for engaging said cooperating means and a radially acting support spring on said sliding surface.

6. Fuel assembly according to claim 1, wherein said upper end of said telescopic leg is inserted into said first shoulder.

* * * * *